United States Patent
Walitzki et al.

(10) Patent No.: US 9,688,393 B2
(45) Date of Patent: Jun. 27, 2017

(54) AIRCRAFT AUXILIARY DRIVE WHEEL TAXI SYSTEM

(71) Applicant: Borealis Technical Limited, North Plains, OR (US)

(72) Inventors: Hans J. Walitzki, Portland, OR (US); Wing S. Luk, Portland, OR (US)

(73) Assignee: Borealis Technical Limited, Gibraltar (GI)

( * ) Notice: Subject to any disclaimer, the term of this patent is extended or adjusted under 35 U.S.C. 154(b) by 15 days.

(21) Appl. No.: 14/734,570

(22) Filed: Jun. 9, 2015

(65) Prior Publication Data

US 2016/0016658 A1 Jan. 21, 2016

Related U.S. Application Data

(60) Provisional application No. 62/009,779, filed on Jun. 9, 2014.

(51) Int. Cl.
*B64C 25/40* (2006.01)

(52) U.S. Cl.
CPC ........... *B64C 25/405* (2013.01); *Y02T 50/823* (2013.01)

(58) Field of Classification Search
CPC .................................................... B64C 25/405
See application file for complete search history.

(56) References Cited

U.S. PATENT DOCUMENTS

| | | | |
|---|---|---|---|
| 7,975,960 B2 | 7/2011 | Cox | |
| 8,220,740 B2 | 7/2012 | Cox et al. | |
| 8,240,599 B2 | 8/2012 | Edelson et al. | |
| 8,360,360 B2 * | 1/2013 | Cros | B64C 25/405 244/100 R |
| 8,528,856 B2 | 9/2013 | Charles et al. | |
| 2010/0276535 A1 * | 11/2010 | Charuel | B64C 25/405 244/50 |
| 2012/0104159 A1 * | 5/2012 | Charles | B64C 25/405 244/50 |
| 2015/0210399 A1 * | 7/2015 | Cox | B64D 15/16 244/50 |

* cited by examiner

*Primary Examiner* — Justin Benedik

(57) ABSTRACT

An auxiliary drive wheel taxi system for driving an aircraft autonomously without reliance on engine operation during ground travel is designed for installation in an aircraft location other than on nose or main landing gear components. The auxiliary drive wheel taxi system may be mounted in an integral housing located internally or externally on an aircraft's body at a selected location relative to main or nose landing gears and includes one or more auxiliary drive wheels mounted on an extensible strut adapted to extend from and retract into the housing. An electric, hydraulic, or pneumatic non-engine drive means controllable to provide torque required to rotate the drive wheel and drive the aircraft at desired taxi speeds may be mounted in a selected location to drive the auxiliary drive wheel. The manually or automatically controllable auxiliary taxi system is operable only to drive the aircraft during taxi.

19 Claims, 1 Drawing Sheet

AIRCRAFT AUXILIARY DRIVE WHEEL TAXI SYSTEM

PRIORITY CLAIM

This application claims priority from U.S. Provisional Patent Application No. 62/009,779, filed 9 Jun. 2014, the disclosure of which is fully incorporated herein.

TECHNICAL FIELD

The present invention relates generally to drive wheel systems designed to move aircraft independently on ground surfaces and specifically to an auxiliary drive wheel system designed to drive an aircraft autonomously on ground surfaces that may be separate from an aircraft's main or nose landing gear wheels.

BACKGROUND OF THE INVENTION

The benefits that may be realized when aircraft are moved during ground travel without operation of an aircraft's main engines are gaining wider recognition in the airline and related industries. Proposals for independently moving aircraft on ground surfaces were initially made decades ago, and various structures and methods useful to independently drive aircraft on the ground without operating engines or assistance from tow vehicles have been proposed since then. Until recently, however, systems and methods for achieving the autonomous ground travel of aircraft have not been successfully implemented.

One system proposed for moving aircraft autonomously during ground travel that has been successfully demonstrated to drive an aircraft in a desired direction at a desired taxi speed without operation of the aircraft's main engines or assistance from an external tow vehicle is mounted to drive one or more nose landing gear wheels or main landing gear wheels so that the wheel or wheels operate as self-propelled drive wheels. Such a system is described, for example, in commonly owned U.S. Pat. No. 7,975,960 to Cox et al; U.S. Pat. No. 8,220,740 to Cox et al; and U.S. Pat. No. 8,240,599 to Edelson et al. A non-engine drive means that is controllable to drive a landing gear wheel may be mounted within or adjacent to the wheel and may be controlled, preferably by an aircraft pilot, to drive the wheel at a desired torque and/or speed required to move the aircraft on a ground surface. While a preferred non-engine drive means in such a system is one or more electric motors, preferably powered by the aircraft's auxiliary power unit, the drive system may also be powered by hydraulic or pneumatic drive motors.

Another system proposed for moving aircraft on the ground without using the aircraft's engines is designed to be mounted on and drive aircraft wheels with brakes, typically only an aircraft's main landing gear wheels. This system is described in U.S. Pat. No. 8,360,360 to Cros et al and U.S. Pat. No. 8,528,856 to Charles et al. The Cros et al system may use a hydraulic or electric drive motor. The Charles et al system relies on an electric motor to move the aircraft during taxi and includes additional structure to cool aircraft brakes during taxi. Charles et al notes, moreover, that some modification of the aircraft's landing gear doors may be needed to accommodate the disclosed system.

The aircraft autonomous drive systems or taxi systems described above are specifically designed to be mounted on and in connection with aircraft landing gear wheels and/or other landing gear structures and are effectively part of the aircraft's landing gear. Consequently, care must be taken so that these drive or taxi systems avoid interference with landing gear operation. Such drive or taxi systems, when mounted on an aircraft's main landing gear, should also not negatively impact aircraft brake capacity. Since the drive and taxi systems currently proposed may be mounted within landing gear wheels, these systems are exposed to many of the same stresses to which other landing gear structures are exposed, including shocks accompanying landing of an aircraft, high rotational velocities and acceleration speeds, and a range of temperature variations. Additionally, the weight of motors and other drive system elements may increase strains and stresses on landing gear components during landing gear operation, and drive system design for autonomous aircraft taxi must take these and the aforementioned factors into account.

There is a need, therefore, for a drive or taxi system capable of driving an aircraft autonomously without reliance on operation of the aircraft's engines or external vehicles during ground travel that is designed to avoid interference with operation of landing gear components or landing gear wheel brakes and that is not subjected to shocks and stresses or other potentially adverse events produced by a landing aircraft. There is a further need for such a drive or taxi system that does not increase potential adverse effects on aircraft landing gear during operation.

SUMMARY OF THE INVENTION

It is a primary object of the present invention, therefore, to provide a drive or taxi system capable of driving an aircraft autonomously without reliance on operation of the aircraft's engines or external vehicles during ground travel that is designed to avoid interference with operation of landing gear components or landing gear wheel brakes and that is not subjected to shocks and stresses or other potentially adverse events produced by a landing aircraft.

It is an additional object of the present invention to provide a drive or taxi system capable of driving an aircraft autonomously without reliance on operation of the aircraft's engines or external vehicles during ground travel designed to avoid increasing potential adverse effects on aircraft landing gear during operation.

It is another object of the present invention to provide a drive or taxi system capable of driving an aircraft autonomously without reliance on operation of the aircraft's engines or external vehicles during ground travel that is not mounted on or in connection with an aircraft landing gear or landing gear wheel.

It is a further object of the present invention to provide a drive or taxi system capable of driving an aircraft autonomously without reliance on operation of the aircraft's engines or external vehicles during ground travel designed to operate independently of the operation of an aircraft's main and nose landing gear and main and nose landing gear wheels.

It is yet another object of the present invention to provide a drive or taxi system capable of driving an aircraft autonomously without reliance on operation of the aircraft's engines or external vehicles during ground travel designed to be operable only when an aircraft is moving on a ground surface.

It is yet a further object of the present invention to provide a drive or taxi system capable of driving an aircraft autonomously without reliance on operation of the aircraft's engines or external vehicles during ground travel that is not part of a flight critical system.

It is a still further object of the present invention to provide a drive or taxi system capable of driving an aircraft autonomously without reliance on operation of the aircraft's engines or external vehicles during ground travel that may be installed on an aircraft with minimal structural changes to the aircraft.

It is a still further object of the present invention to provide an auxiliary drive or taxi system capable of driving an aircraft autonomously without reliance on operation of the aircraft's engines or external vehicles during taxi and other ground travel that is adapted to operate to augment or replace a taxi drive system mounted on an aircraft's nose or main landing gear wheels.

The aforesaid objects are accomplished by providing a drive or taxi system capable of driving an aircraft autonomously without reliance on operation of the aircraft's engines or external vehicles during ground travel that is designed to be installed on an aircraft in a location other than the aircraft's nose landing gear or main landing gear wheels or other landing gear components. The taxi system of the present invention includes an auxiliary drive wheel separate from an aircraft's nose and main landing gear components. The auxiliary drive wheel is designed to be rotatably mounted on an extensible strut element adapted to extend from and retract into an auxiliary drive wheel housing that may be located internally or externally of an aircraft's body. An electric, hydraulic, or pneumatic drive means and a suitable source of power for the drive means controllable to provide the torque required to rotate the drive wheel and drive the aircraft at desired taxi speeds may be mounted in one or more locations selected to transmit power and enable the drive means to effectively transmit the required torque to the drive wheel. The auxiliary drive wheel taxi system is designed to be operable only when an aircraft is on a ground surface and remains within its housing while the aircraft is taking off, in flight, during landing, and/or at any other times when the aircraft may not be safely driven on the ground. The auxiliary drive wheel taxi system may also be installed on aircraft equipped with nose or main landing gear autonomous taxi drive system and may be designed to augment or replace operation of landing gear wheel taxi drive systems.

Additional objects and advantages of the present invention will be apparent from the following description, drawings, and claims.

DESCRIPTION OF THE INVENTION

An aircraft that is driven on the ground during taxi by a drive system that employs a motive source other than the aircraft's main engines or an external vehicle can produce a number of benefits for the airline that operates the aircraft as well as airports where these aircraft are driven. These benefits range from reductions in fuel usage, fuel costs, and airport ramp congestion to improvements in airport air quality and reductions in turnaround time. Such benefits may be achieved when aircraft are equipped with the nose landing gear wheel and main landing gear wheel drive systems described above. It is also possible, however, to achieve the benefits of autonomous aircraft ground travel and taxi without relying on operation of aircraft main engines with a drive system that is not mounted on an aircraft's nose or main landing gear structures and components and, as a result, may be designed to drive an aircraft without having to compensate for operations and/or structures associated with landing gear wheels and other components. The aircraft taxi system of the present invention may be installed on an aircraft in a location separate from the nose and main landing gears to drive the aircraft during taxi as effectively as a landing gear-mounted system.

Figure 1:
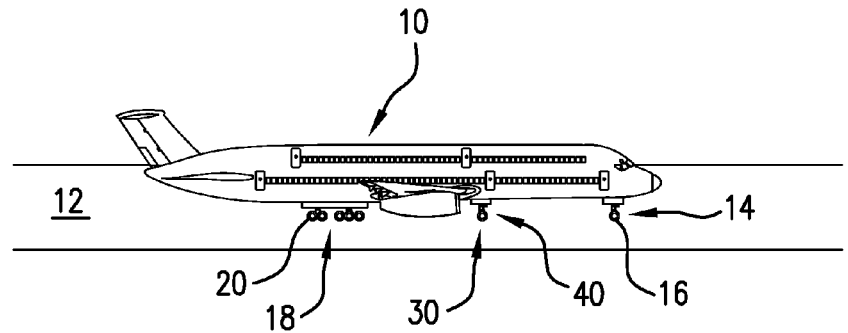
FIG. 1 is a perspective view of an aircraft equipped with the auxiliary drive wheel taxi system of the present invention taxiing on a runway.

Referring to the drawings, FIG. 1 shows, in side perspective view, an aircraft 10 being driven during taxi on a runway 12 by the auxiliary drive wheel taxi system of the present invention. The aircraft 10 may be driven during taxi to a takeoff location on runway 12, to a parking location after landing, or to a hangar or other location, such as for maintenance, de-icing, and other operations. The system of the present invention may be used to drive an aircraft on a ground surface at any time the aircraft 10 must move from one ground location to another. The aircraft 10 shown in FIG. 1 has a nose landing gear 14 with a pair of nose landing gear wheels 16 and multiple main landing gears 18, with main landing gear wheels 20. The aircraft 10 is further equipped with an auxiliary drive wheel taxi system 30 in accordance with the present invention. The taxi system 30 is shown located on the same ground-facing side of the aircraft body or fuselage as the respective nose and main landing gears 14 and 18. The present auxiliary drive wheel taxi system 30 may have a structural arrangement that is similar to that of a nose landing gear. Other structural arrangements that function as described herein are also contemplated to be within the scope of the present invention.

Figure 2:
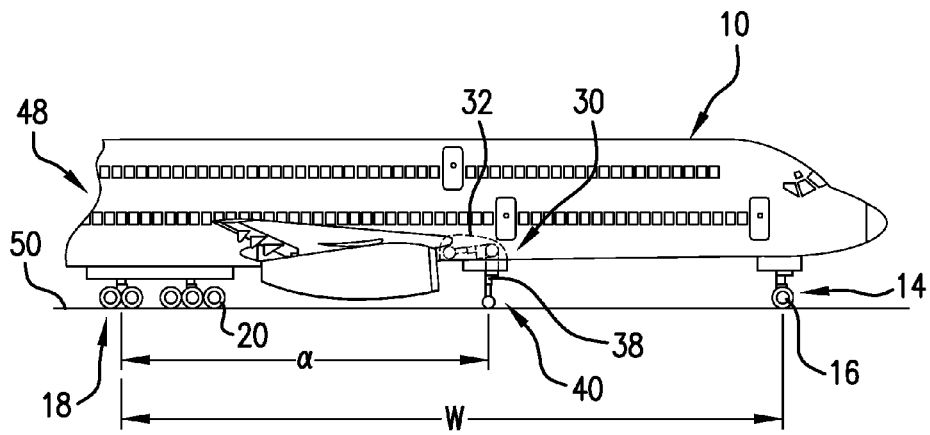
FIG. 2 schematically illustrates an aircraft equipped with the auxiliary drive wheel taxi system of the present invention showing one possible location of a taxi system auxiliary drive wheel and auxiliary wheel drive means relative to the aircraft's nose landing gear and main landing gear when the aircraft is on a ground surface.
Figure 3:
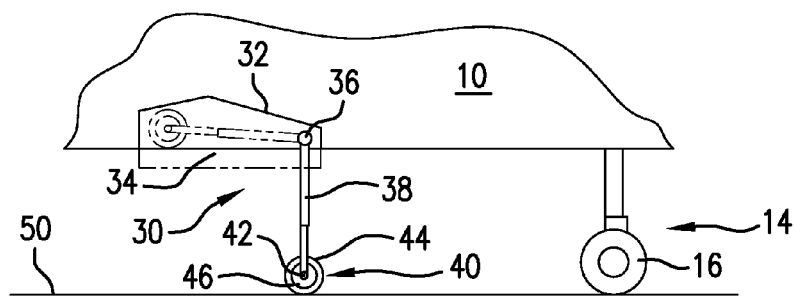
FIG. 3 schematically illustrates an aircraft equipped with the auxiliary drive wheel taxi system of the present invention illustrating one possible housing configuration and location.

The structural arrangement of the present auxiliary drive wheel taxi system 30 is shown schematically and in more detail in FIG. 2. The system may include a housing 32, which is shown within the body of the aircraft 10. This housing may be designed with access panels or doors 34, shown more clearly in FIG. 3, which may be controlled manually or automatically to open to allow system components to extend from the aircraft and to close when the system components have been retracted into the housing 32 as described below. The configuration of the housing 32 shown in FIGS. 2 and 3 is only one possible housing configuration. Other functionally equivalent configurations are contemplated to be within the scope of the present invention.

The access doors 34 may have a configuration, which like landing gear bay doors, blends smoothly and aerodynamically with the aircraft surface when the doors are closed. An end 36 of a strut element 38 may be pivotally or similarly secured within the housing 32 to enable the strut to extend from the housing when the system is operational and to retract into the housing when the system should not be in operation. One or more auxiliary drive wheels 40 are mounted for rotation, such as on an axle (not shown) at an extent 42 of the strut 38 opposite the end 36. In some applications a single wheel 40 may effectively drive an aircraft as described herein, while in other applications, a pair of wheels 40 may be more effective.

In FIGS. 2 and 3 the housing 32 is shown opened and the strut 38 extended so that the one or more wheels 40 contacts a ground surface only when the aircraft 10 is actually on the ground and is to be driven during ground travel by the auxiliary drive wheel taxi system. One or more manually or automatically controllable mechanisms (not shown), such as those currently used to extend and retract landing gear struts, may be provided to control the extension and retraction of the auxiliary drive wheel strut 38. Such a controllable mechanism may include, for example without limitation, a hydraulically or pneumatically operated cylinder or other device that is adjustable to control the amount of downward force exerted by the drive wheel 40, and a tire 44 mounted on the drive wheel 40, on the aircraft's ground travel surface to control traction during operation of the drive wheel, as discussed below.

Another set of manually or automatically controllable mechanisms (not shown) may be provided to control opening and closing of access doors 34 in the housing 32. This second set of controllable mechanisms may be designed to open the housing access doors so that the strut 38 may be extended when operation of the present auxiliary drive wheel taxi system to drive the aircraft 10 is to start. The access doors 34 will then be closed by the second set of controllable mechanisms in response to retraction of the strut 38 when operation of the taxi system is not needed, such as when aircraft 10 has arrived at a selected takeoff location. Such controllable mechanisms may be similar to those used for opening and closing landing gear bay doors, and any one of a number of available mechanisms for this purpose may be used in the present taxi system.

Each auxiliary drive wheel 40 may be driven by a non-engine drive means, indicated as non-engine drive means 46. The non-engine drive means 46 is designed to be controllable, preferably by a pilot of the aircraft 10, to transfer torque from the non-engine drive means 46 to the drive wheel 40 to move the wheel at a torque and speed desired or required to move the aircraft on a ground surface. The non-engine drive means 46 may be any one of a number of suitable electric, hydraulic, or pneumatic motors capable of providing the necessary torque to drive the drive wheel 40 and move the aircraft 10 without operation of the aircraft's main engines. The non-engine drive means 46 is shown located within a hub of the drive wheel 40. The non-engine drive means 46 may also be located in other locations, for example, without limitation, adjacent to the wheel, around the axle, on the strut, or in a location remote from the drive wheel 40 within the aircraft. A transmission element or the like (not shown) may be provided to operatively connect the drive means 46 with the drive wheel 40. A range of transmission elements capable of providing a torque transfer connection between a drive means and a drive wheel are available and may be used for this purpose. The specific transmission element selected may depend on the specific location of the non-engine drive means 46 relative to the drive wheel 40.

Whatever type of non-engine drive means 46 is selected to drive the auxiliary drive wheel 40, power for the selected drive means may be supplied by a source of power already present on board the aircraft. As an example, power for a non-engine drive means that is an electric motor may be supplied by an aircraft's auxiliary power unit (APU). Alternatively or in addition, a rechargeable power storage unit that may be charged by excess onboard power during flight may be provided within the housing 32. Similarly, power for hydraulic or pneumatic motors used as drive means may be supplied by an aircraft's hydraulic system or by bleed air. Other suitable power sources, including batteries and the like, are also contemplated to be within the scope of the present invention. Suitable connections may be provided between a power source and the selected non-engine drive means.

The auxiliary drive wheel taxi system of the present invention may be easily incorporated into a desired location in a new aircraft during construction. Retrofitting an existing aircraft with the present taxi system requires only minimal structural changes to an aircraft body. The housing 32 and the other components of the present auxiliary drive wheel taxi system may be designed as an integral unit that may be fitted into a selected aircraft location without significant modification of the aircraft's body. Some structural adjustment and/or reinforcement of the aircraft fuselage in the area of the selected location for the taxi system 30 may be needed to ensure that additional forces that might be produced by the auxiliary drive wheel taxi system components are absorbed. Alternatively, the present auxiliary drive wheel taxi system could be mounted on the exterior of an aircraft, although some structural reinforcement of the aircraft body is also likely to be required to support the housing 32 and enclosed taxi system components. If this location is chosen, the housing 32 may be designed with an aerodynamic configuration.

The auxiliary drive wheel 40 and strut 38 of the taxi system of the present invention will be extended outwardly of the housing 32 so that the wheel 40 contacts a ground surface to drive the aircraft 10 only during ground operations. It is not necessary, therefore, for these structures of the present auxiliary drive wheel taxi system to be designed to absorb the level of force absorbed by aircraft landing gear components upon landing or at other times. Further, unlike the nose landing gear and main landing gear drive systems discussed above, the present auxiliary drive wheel taxi system does not add any weight to the nose or main landing gears. Additional weight added to an aircraft by installation of the strut, axle, wheel or wheels, and other components required by the present system can be minimized or optimized at a lowest possible weight because these structures are not subjected to landing and takeoff levels of forces. Consequently, the auxiliary drive wheel taxi system components of the present invention may be smaller and lighter weight than aircraft landing gear components. For example, as shown in FIG. 3, the relative sizes of the auxiliary drive wheel 40 and the nose landing gear wheel 16 may be different, and the auxiliary drive wheel 40 may have a significantly smaller diameter than that of the nose landing gear wheel 16.

Additionally, the strut 38 and auxiliary drive wheel 40 may be made of materials that are strong and lightweight, but may not required to withstand the forces to which nose and main landing gear struts and wheels are typically subjected and must be designed to withstand. One exemplary material for this purpose is a fiber reinforced carbon material. Other types of composites and similar materials that have sufficient strength to withstand forces associated with low taxi speed aircraft ground operations may also be used to form components of the present auxiliary drive wheel taxi system and are contemplated to be within the scope of the present invention.

During takeoff, flight, and landing of the aircraft 10, the strut 38 and mounted auxiliary drive wheel 40 are not extended outside the body of the aircraft, but are maintained in a retracted condition within the housing 32, and the doors 34 of the housing 32 are maintained in a closed position, in a manner similar to that of the aircraft landing gear bay doors during flight. The doors 34 are not opened, and the strut 38 with the auxiliary drive wheel or wheels 40 is not extended until after the aircraft has landed. Pre-spinning of the auxiliary drive wheel 40 prior to extension may be required or desirable, depending on how long after landing the wheel 40 makes contact with the aircraft's travel surface and the ground speed of the aircraft at that time. Retraction of the auxiliary drive wheel 40 and strut 38 into the housing 32 may occur at an optimum interval prior to takeoff so that the components of the present system are enclosed within the housing 32 and are not operational during takeoff. The components of the present taxi system are not flight critical components and do not form part of a flight critical system. Therefore, normal operation of an aircraft equipped with the present taxi system can continue even if this taxi system fails to operate.

The selection of a location on an aircraft body for mounting the auxiliary drive wheel taxi system of the present invention can affect the traction between the auxiliary drive wheel 40 and the tarmac or other ground surface 50 on which an aircraft is driven by the taxi system, as shown in FIG. 2. Traction between the drive wheel 40 and the ground surface 50 may be increased by locating the drive wheel 40 closer to the main landing gear 16 than to the nose landing gear 18. More specifically, locating the drive wheel 40 at a distance a from the main landing gear wheels 20, which is less than the distance W between the main landing gear wheels 20 and the nose landing gear wheels 16, effectively increases traction. The closer the drive wheel 40 is to the main landing gear wheels 20, the greater the downward force that can be applied. Traction may also be enhanced by selecting the tires 44 to be mounted on the drive wheel 40 with a tread designed for optimum traction. Since the tires 44 on the present auxiliary drive wheel taxi system are not required to participate in landing operations, they may be made from a softer material than typical aircraft landing gear tires. In addition to optimizing aircraft ground traction with a selected tire tread pattern, traction on icy or other slippery surfaces may be further optimized by adding studs to the drive wheel tires when an aircraft must be driven on an icy or slippery ground surface.

Other mounting locations for the auxiliary drive wheel taxi system of the present invention in addition to those discussed above may be more suitable for some aircraft. For example, a location behind the main landing gear 18 in the tail section 48 of the aircraft 10 may more effectively drive some aircraft. Alternatively, two auxiliary drive wheel taxi systems may be mounted in opposed locations relative to an aircraft's fuselage on or inside an aircraft's wings to drive other aircraft more effectively.

Control of the operation of the auxiliary drive wheel taxi system of the present invention may be manual, automatic, automatic with manual override, or any desired control combination, and suitable controls may be provided in the cockpit of an aircraft equipped with the present taxi system. Control of the present taxi system may be designed to enable a pilot of an aircraft equipped with this taxi system to manually activate the system so that the housing doors 34 open and the strut 38 holding the drive wheel 40 extends so that the wheel tire 44 contacts the ground and the non-engine drive means 44 is activated to transmit driving torque to the wheel until the system is de-activated. When the system is fully de-activated, the strut 38 retracts into the housing 32, and the doors 34 close. It is contemplated that the control mechanisms that cause the strut 38 to extend and retract and the doors 34 to open and close may be connected to any pilot-activatable controls for the taxi system. Various combinations of controls may used to manually and/or automatically control operation of the present auxiliary drive wheel taxi system and keep this system operating to drive an aircraft on a ground surface as long as the aircraft may be driven safely on the ground surface. If it is desired to provide fully automated control of the present taxi system, a control system may be provided with sensed operating parameters and feedback mechanisms that will cause the taxi system to stop operating in the event sensed parameters indicate that continued operation of the taxi system is unsafe or should not be continued for any other reason.

The auxiliary drive wheel taxi system may additionally be installed on aircraft that are also equipped with other drive systems for autonomous aircraft ground travel that do not rely on main engines or external vehicles, for example drive systems for nose landing gear wheels and/or drive systems for main landing gear wheels. Examples of such systems are described in the art cited in the Background of the Invention section above, although these are not the only drive systems that may benefit from the back-up capability or redundancy that may be provided by an additional aircraft ground travel drive system. The additional weight added by equipping an aircraft with an onboard drive system with the auxiliary drive wheel taxi system of the present invention may be a consideration in some aircraft applications.

While the present invention has been described with respect to preferred embodiments and a single auxiliary drive wheel, this is not intended to be limiting, and other arrangements and structures, including more than one auxiliary drive wheel, that perform the required functions are contemplated to be within the scope of the present invention.

INDUSTRIAL APPLICABILITY

The present invention will find its primary application where it is desired to efficiently and safely drive aircraft on ground surfaces without reliance on use of the aircraft's main engines or external vehicles and where it is desired to provide a drive system capable of driving an aircraft autonomously during ground travel without operation of the aircraft's engines of eternal vehicles that may be installed on an aircraft in locations other than on aircraft landing gear wheels and other landing gear structures.

The invention claimed is:

1. An independent auxiliary drive wheel taxi system for driving an aircraft autonomously independently of operation of aircraft nose and main landing gears and without reliance on aircraft engines or external vehicles during taxi comprising, on an aircraft equipped with a nose landing gear with one or more nose landing gear wheels and one or more main landing gears each with one or more landing gear wheels, an extendable and retractable strut-mounted auxiliary drive wheel mounted externally or internally on said aircraft in one or multiple ground facing locations other than on or in said nose and main landing gear wheels in a housing wherein said auxiliary drive wheel comprises a drive motor mounted in or on said auxiliary drive wheel controllably powered to drive said drive auxiliary drive wheel and to drive said aircraft autonomously during ground travel.

2. The system of claim 1, further comprising manual or automatic control means for extending and retracting said auxiliary drive wheel into and out of said housing and activating and deactivating said drive motor.

3. The system of claim 1, wherein said ground facing location comprises a distance a from the main landing gears that is less than a distance W between the main landing gears and the nose landing gear and is selected to optimize traction between a tire mounted on said auxiliary drive wheel and a ground surface on which said aircraft is driven by said auxiliary drive wheel taxi system.

4. The system of claim 1, wherein said housing comprises a bay with openable doors supporting said strut-mounted auxiliary drive wheel completely within said bay when retracted and said doors are closed and in driving contact with the ground surface when extended and said doors are open.

5. The system of claim 1, wherein said strut-mounted extendable and retractable auxiliary drive wheel and said housing are made of a material that is lighter in weight than a material from which said nose landing gear and said main landing gears are made.

6. An auxiliary drive wheel taxi system for driving an aircraft equipped with a landing gear wheel taxi drive system autonomously on a ground surface independently and during operation of the aircraft's landing gear wheel taxi drive system, comprising:
   a. on an aircraft equipped with a landing gear wheel taxi drive system operable to drive nose or main landing gear wheels, an openable housing mounted in or on a body of the aircraft in a ground facing location other than on or in the nose and main landing gear wheels;
   b. a strut element mounted within said housing to move between a retracted position wherein the strut element is fully enclosed within said housing when said housing is closed and an extended position wherein an end of the strut element extends outwardly from the aircraft body when said housing is open;
   c. at least one drive wheel rotatably mounted on said end of the strut to support a tire in driving contact with a ground surface when said strut is in said extended position; and
   d. a non-engine drive means controllable for transmitting torque to said at least one drive wheel to drive said aircraft on said ground surface independently of and during operation of the aircraft's landing gear wheel taxi drive system.

7. The system of claim 6, wherein said housing is mounted within the aircraft body and said ground facing location comprises a distance a from wheels of the main landing gear that is less than a distance W between the aircraft's nose landing gear and the aircraft's main landing gear.

8. The system of claim 7, wherein said ground facing location is selected to optimize traction between said tire and said ground surface.

9. The system of claim 8, wherein said ground facing location is selected to optimize downward force applied by said at least one drive wheel.

10. The system of claim 6, wherein a diameter of said at least one drive wheel is smaller than a diameter of a nose landing gear wheel of said aircraft.

11. The system of claim 6, wherein said strut element and said at least one drive wheel are formed of a material selected to be lighter in weight than a material forming components of nose landing gears and main landing gears of said aircraft.

12. The system of claim 6, wherein said non-engine drive means comprises an electric drive motor, a hydraulic drive motor, or a pneumatic drive motor, and wherein a supply of power to power said non-engine drive means is located onboard said aircraft.

13. The system of claim 6, further comprising a pilot-activated manual control system or an automatic control system in operative connection with said openable housing, said strut element, and said non-engine drive means to manually or automatically control operation of said auxiliary drive wheel taxi system independently of and during operation of the aircraft's landing gear wheel taxi drive system.

14. A method for driving an aircraft autonomously on a ground surface with an auxiliary drive system, comprising
   a. equipping an aircraft with an auxiliary drive wheel taxi system comprising at least an openable housing mounted within a body of the aircraft at a location other than on or in a nose landing gear and a main landing gear, an extendable and retractable auxiliary drive wheel supported on a strut mounted within the housing and driven by a drive motor powered by an onboard power supply, and a tire mounted on the auxiliary drive wheel in contact with a ground surface when said auxiliary drive wheel is extended;
   b. providing a control system automatically activatable or activatable by a pilot of said aircraft to control operation of the auxiliary drive wheel taxi system only when the aircraft is taxiing on a ground surface;
   c. after the aircraft has landed on a ground surface, automatically or manually activating the control system to open the openable housing and extend the strut so that the tire mounted on the auxiliary drive wheel contacts the ground surface and to activate drive motor to drive the aircraft on the ground surface; and driving the aircraft on the ground surface at a desired taxi speed after landing; and
   d. when the aircraft has been driven to a selected takeoff location or at a selected time prior to takeoff, further activating the control system to deactivate the drive motor, retract the auxiliary drive wheel, and close the housing so that the taxi system is not operable to drive the aircraft.

15. The method of claim 14, further comprising selecting said location to mount said housing at a distance from said main landing gear selected to optimize traction between said auxiliary drive wheel tire and said ground surface.

16. The method of claim 15, further comprising increasing traction between the auxiliary drive wheel tire and the ground surface by locating the auxiliary drive wheel closer to the main landing gear than to the nose landing gear.

17. The method of claim 16, further comprising locating the auxiliary drive wheel at a distance a from wheels of the main landing gear that is less than a distance W between the wheels of the main landing gear and wheels of the nose landing gear.

18. The method of claim 14, further comprising equipping one or more nose or main landing gear wheels of said aircraft with a controllable powered drive system designed to drive said aircraft autonomously during ground travel and activating said control system to control operation of the auxiliary drive wheel taxi system to replace or augment operation of the controllable powered drive system as required to drive the aircraft during ground travel.

19. The method of claim 14, further comprising equipping the aircraft with an auxiliary drive wheel taxi system comprising a pair of extendable and retractable auxiliary drive wheels mounted on the strut.

* * * * *